(12) United States Patent
Bremer et al.

(10) Patent No.: US 6,546,090 B1
(45) Date of Patent: *Apr. 8, 2003

(54) APPARATUS AND METHOD FOR COMMUNICATING VOICE AND DATA BETWEEN A CUSTOMER PREMISES AND A CENTRAL OFFICE

(75) Inventors: Gordon Bremer, Clearwater, FL (US); Thomas Bingel, Belleair Beach, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/374,774

(22) Filed: Aug. 16, 1999

Related U.S. Application Data

(62) Division of application No. 08/962,796, filed on Nov. 3, 1997, now Pat. No. 6,061,392.
(60) Provisional application No. 60/033,660, filed on Dec. 17, 1996.

(51) Int. Cl.[7] .............................................. H04M 11/00
(52) U.S. Cl. .................................................. 379/93.08
(58) Field of Search .......................... 379/93.28, 93.31, 379/93.08, 93.09, 93.01; 375/222

(56) References Cited

U.S. PATENT DOCUMENTS

| | | | | |
|---|---|---|---|---|
| 3,875,339 A | * | 4/1975 | Gruen et al. ................... 179/15 |
| 4,757,495 A | * | 7/1988 | Decker et al. ................. 370/76 |
| 4,800,439 A | * | 1/1989 | Yoshino ...................... 379/100 |
| 4,821,312 A | * | 4/1989 | Horton et al. ................. 379/93 |
| 4,953,160 A | * | 8/1990 | Gupta .......................... 370/76 |
| 5,003,579 A | * | 3/1991 | Jones .......................... 379/93 |
| 5,475,691 A | * | 12/1995 | Chapman et al. ......... 370/110.4 |
| 6,061,392 A | * | 5/2000 | Bremer et al. ............... 375/222 |

* cited by examiner

Primary Examiner—Stella Woo
(74) Attorney, Agent, or Firm—Thomas, Kayden, Horstemeyer & Risley, LLP

(57) ABSTRACT

A method and system are provided for communicating voice and data across a communication link, in a manner that senses and dynamically adapts to the simultaneous transmission of voice information across the local loop. In accordance with one aspect of the invention, a method is provided for dynamically communicating data over a local loop using a modem comprising the steps of transmitting data in a full-band transmission state, sensing a band-limiting condition, and adjusting the transmission of data from the full-band transmission state to a band-limited transmission state, in response to the sensing step. In accordance with the method, data may be transmitted by the modem across the local loop at the same time that voice information is communicated via telephone across the same local loop. A significant aspect of the present invention is the dynamic allocation of the data transmission bandwidth, whereby the invention senses a condition indicative of whether voice information is being communicated. If so, then the system shifts and/or narrows the data transmission bandwidth to allow for voice communications without interference from or with the data transmission. However, when no voice information is being communicated, the invention dynamically allocates the data transmission bandwidth to utilize at least a portion, if not all, of the frequency band otherwise used for communicating voice information.

83 Claims, 7 Drawing Sheets

APPARATUS AND METHOD FOR COMMUNICATING VOICE AND DATA BETWEEN A CUSTOMER PREMISES AND A CENTRAL OFFICE

RELATED APPLICATION

This application claims the benefit of U.S. Provisional Patent Application Ser. No. 60/033,660, filed on Dec. 17, 1996, and entitled Digital Subscriber Loop Data Communications Method Enabling Simultaneous Data and POTS Without POTS Filters/Splitters or Special Premise Wiring. This application is a divisional of and claims the benefit of U.S. patent application Ser. No. 08/962,796, filed on Nov. 3, 1997, now issued as U.S. Pat. No. 6,061,392 and entitled APPARATUS AND METHOD FOR COMMUNICATING VOICE AND DATA BETWEEN A CUSTOMER PREMISES AND A CENTRAL OFFICE. The foregoing provisional application 60/033,660 and the foregoing issued U.S. Pat. No. 6,061,392 are hereby incorporated herein by reference in their entirety.

FIELD OF THE INVENTION

The present invention generally relates to system for communicating both voice and data over modems, and more particularly to high speed modems offering robust communication between a central office and a customer premises.

BACKGROUND OF THE INVENTION

High speed digital modems, such as Rate Adaptive Digital Subscriber Loop ("RADSL") modems, are able to transfer data at high rates over the local loop, because they use frequencies which are significantly higher than the voice band frequencies used in Plain Old Telephone Service ("POTS"). By way of example, speech on a POTS system generally occurs in the frequency spectrum between about 0 Hz ("DC") and about 4 kHz, whereas RADSL modems use the frequency spectrum of between about 20 kHz to about 1 MHz. High speed digital modems generally include error detection circuitry which measures the errors which occur during communications. By making such measurements, they are then able to update their statistical knowledge of the wire pair which extends between the subscriber's location and the central office. Using that statistical knowledge, the modems can select optimal operating speeds. These modems were originally proposed when it was thought that services, such as video-on-demand, would be desirable.

As modem technology has developed, another need has arisen, in that the Internet has become a popular medium for both personal and work related use.

While the high speeds of RADSL modems seem to be quite desirable, their use of high frequencies mean that they also need to be protected from high frequency noise, such as cross-talk from adjacent channels or adjacent loops in the loop cable binder, as such noise causes them to downwardly adjust their operating speeds. In order to avoid certain types of noise, RADSL modems typically require the use of filters, called POTS filters, together with splitters for isolating Public Switched Telephone Network ("PSTN") equipment from the RADSL modems. Indeed, without POTS filters and POTS splitters, POTS signals directly interfere with the RADSL spectrum below about 20 kilohertz and the RADSL spectrum directly interferes with the POTS. POTS filters and POTS splitters reduce POTS signaling transients from interfering with RADSL data transmission. In addition, the use of the high RADSL bandwidth demands relatively high transmit power, which can cause distortions and dynamic range overload to POTS equipment.

Unfortunately, the manufacture and installation of POTS filters and splitters are expensive, and their use sometimes requires rewiring of the customer premises to ensure that all PSTN equipment is properly isolated from the RADSL modems and computing equipment. Consequently, it would be desirable to avoid the use of POTS splitters and filters, in order to avoid the expense they impose (e.g., purchase cost and possible rewiring of customer premises).

Accordingly, there appears to be a need for a mass market modem which has data transfer rates greater than the 33.6 Kbps attainable by PSTN modems, yet under the rate that requires the addition of POTS filters, splitters, etc. to address noise and deleterious transmission line effects often encountered in high speed DSL modems.

Yet another problem which is manifest in increased Internet access and data communications is the increasingly limited availability to the customer phone line or local loop for its original purpose, i.e., voice communications. Of course, one solution is for a customer to purchase an additional phone line. This, however, imposes an additional cost on the customer. Moreover, unless the line is dedicated by the customer for a specific purpose (which is poor utilization), the second line may not always be available when needed.

Accordingly, there is a need to provide an improved modem that accommodates data transmissions, while simultaneously allowing traditional voice operation of a telephone attached to the same line at the customer premise. It is particularly desirable to have such a modem that does not require the use of costly POTS filters and splitters.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method and apparatus for communicating data across a local loop, in a manner that senses and dynamically adapts to the simultaneous transmission of POTS (e.g., voice or PSTN modem) information across the local loop. In accordance with one aspect of the invention, a method is provided for dynamically communicating data over a local loop using a modem comprising the steps of transmitting data in a full-band transmission state, sensing a band-limiting condition, and adjusting the transmission of data from the full-band transmission state to a band-limited transmission state, in response to the sensing step. The step of sensing a band-limiting condition includes both the detection of the onset of a condition indicating that the method should enter the band-limited transmission state, as well as the detection of the cessation of that condition, indicating that the method should enter the full-band transmission state from the band-limited transmission state.

In accordance with the method of the present invention, data may be transmitted by the modem across the local loop at the same time that POTS (e.g., voice or PSTN modem data) information is communicated across the same local loop. A significant aspect of the present invention is the dynamic allocation of the data transmission bandwidth, whereby the invention senses a condition indicative of whether POTS information is being communicated. If so, then the system shifts and/or narrows the data transmission bandwidth to allow for voice communications without interference from or with the data transmission. However, when no POTS information is being communicated, the invention dynamically allocates the data transmission bandwidth to utilize at least a portion, if not all, of the frequency band otherwise used for communicating voice information.

In accordance with the preferred embodiment, the method senses an off-hook condition of a telephone handset of a telephone electrically connected to the local loop. In use, a local loop extending between a customer premises and a central office branches, at the customer premise, to support multiple connections to the local loop. In this regard, the various branches or connections are typically routed throughout a customer premises to phone jacks, such as RJ-11 jacks. Multiple telephones may be plugged directly into these jacks for voice communication across the local loop. Similarly, a modem constructed in accordance with the present invention may be plugged directly into one of these jacks. The off-hook condition is preferably sensed by detecting either a change in impedance in the telephone line, or alternatively, a drop in line voltage across the telephone line.

In accordance with one embodiment of the invention, the full-band transmission state is defined by a transmission frequency bandwidth having a lower frequency boundary of less than about 15–20 kilohertz (and preferably less than 4 kilohertz). In the band-limited transmission state, the transmission frequency bandwidth has a lower frequency boundary of greater than 4 kilohertz. The significance of these values, for purposes of the invention, is that when no voice information is being communicated across the local loop, the transmission frequency bandwidth invades that frequency band generally dedicated to the transmission of voice information (i.e., the 0–4 kilohertz POTS frequency band). When, however, the invention senses that POTS information is being communicated across the local loop, or that there is a demand for the POTS band (e.g., telephone off-hook, ring, etc.), then the embodiment shifts the lower boundary of the transmission frequency bandwidth above the generally 4 kilohertz upper limit of the voice band. Preferably, the lower boundary will be shifted upwardly to approximately 20 kilohertz, to allow sufficient separation between the voice and data transmission frequency bands so that no interference between the two is realized, either by voice information corrupting data, or data transmission being heard in the voice band as noise.

For purposes of the preferred embodiment of the present invention, the precise value of the upper boundary of the transmission frequency bandwidth is not so significant, as it is the dynamic adjustment of the lower boundary and/or the reduced power in POTS mode, that realizes the inventive step. However, it will be appreciated that the upper boundary will generally be greater than 40 kilohertz in order to define a meaningful transmission frequency bandwidth for data transmission. Indeed, in the preferred embodiment, the upper frequency boundary is approximately 80 kilohertz. It is believed that this frequency is low enough that transmissions may be effectively implemented without the need for POTS filters or POTS splitters, and therefore significantly reducing the cost of implementing the inventive system. Signal-to-noise ratio is high to permit reasonable data throughput without excessive power incident on attached POTS devices. Also, premises wiring and subscriber loop stubs do not cause substantive nulls in the frequency response. It will be further appreciated that shifting of the upper frequency boundary is not relevant to the present invention. That is, the upper boundary may be shifted in conjunction with the shifting of the lower frequency boundary, or alternatively, the upper frequency boundary may remain substantially fixed.

It will be further appreciated that depending upon loading, line conditions, and other factors the spectral shape of the band-limited xDSL transmission may be varied to minimize noise, intermodulation products, or other interference within the POTS frequency band. More particularly, it is generally understood that the power density of xDSL transmissions is generally greater than that of POTS transmissions. Merely shifting the xDSL transmission into the band-limited transmission state with a lower cutoff frequency of approximately 20 kHz may not always provide a wide enough guard band to prevent interference with the POTS band. Line loading, line conditions, and other factors (which differ among local loops) factor into this determination. Intermodulation products are another source of noise that often is present within the POTS band. When such noise is present within the POTS band, the band-limited transmission state may be further configured by reducing the power-density of the xDSL transmission. Another, related solution may be to uniquely shape the spectral curve for xDSL transmissions. This, for example, may be done by tapering the lower frequency portion of the curve (i.e., that portion near the approximately 15–20 kHz frequency).

In accordance with another aspect of the preferred embodiment, a modem is provided for communicating data across a local loop. The modem includes an input/output signal line that is electrically connected with the local loop (e.g., plugged into an RJ-11 phone jack). The modem also includes a processor unit that is adapted for operation in one of two states: a full-band transmission state and a band-limited transmission state. The full-band transmission state is defined by a lower frequency boundary at a value below approximately 15–20 kilohertz and an upper frequency boundary generally greater than 40 kilohertz (as discussed above). The band-limited state is defined by a lower frequency boundary greater than 4 kilohertz and an upper frequency boundary greater than 40 kilohertz (which may or may not be the same as the upper frequency boundary for the full-band transmission state). The modem further includes a sensor or other sensing means for sensing that the local loop is in POTS mode (e.g. transmitting POTS information, or preparing to transmit POTS information), and the data signal power and bandwidth are adoptively altered to provide data without out inteferring with the POTS transmission. Upon sensing the band-limiting condition, such as an off-hook condition, the controller causes the processor unit to upwardly shift the lower frequency boundary of the transmission frequency band and operate in the band-limited, or reduced-power, state. Likewise, upon sensing no band-limiting condition (or a cessation in the band-limiting condition), the controller causes the processor unit to downwardly shift the lower frequency boundary of the transmission frequency band, and operate in the full-band transmission state, to maximize data throughput.

In accordance with yet a further aspect of the present invention, a method is provided for simultaneously communicating both voice and data between a customer premises and a central office across a local loop. In accordance with this aspect of the invention, the method comprises the steps of (1) transmitting data between the customer premises and the central office in a first frequency band, wherein the first frequency band is defined by an upper frequency boundary and a lower frequency boundary; (2) allocating a second frequency band for transmitting voice information between the customer premises and the central office; (3) sensing a band-limiting condition; and (4) dynamically shifting the lower frequency boundary of the first frequency band in response to the sensed band-limiting condition. In accordance with the invention, the lower frequency boundary of the first frequency band shifted to at least partially overlap the second frequency band when no band-limiting condition exists. The lower frequency boundary of the first frequency band is further shifted to avoid overlapping with any portion of the second frequency band when the band-limiting condition exists.

In accordance with yet a further aspect of the invention, a modem is provided for communicating across a communication link capable of single-use transmissions and multiple-use transmissions. The term single-use transmissions is used to generally connote that a single transmission or communication is occurring across the link. For example, a single PSTN voice call, or a single data communication transmission. The term multiple-use transmissions is used to generally imply that multiple transmissions or communications are occurring simultaneously. For example, the simultaneous transmission of a data communication and a PSTN voice call. The modem constructed in accordance with this aspect of the invention includes an input/output signal line in communication with the communication link. It further includes a processor unit adapted for operation in one of at least two states, a full-band transmission state and a band-limited state, wherein the full-band transmission state occurs when single-use transmissions are occurring across the transmission link, and the band-limited transmission state occurs when multiple-use transmissions are occurring across the communication link.

It will be appreciated that, in accordance with a broad inventive aspect, the present invention operates by adjusting transmit power between a band-limited transmission state and a full-band transmission state. Generally (but not necessarily always), the full-band transmission state occurs when the communication link is operating in a single-use transmission mode, while the band-limited transmission state generally occurs when the communication link is operating in a multiple-use transmission mode. In accordance with this broad concept of the invention, substantial transmission energy is transmitted by the modem in or near the POTS frequency band, when the modem is transmitting in the full-band state. Conversely, very little (ideally zero) energy is transmitted by the modem in or near the POTS frequency band, when the modem is transmitting in the band-limited state. This allows for simultaneous POTS transmissions (e.g., voice, PSTN modem, etc) in the POTS frequency band, and band-limited modem transmissions.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Figure 1:
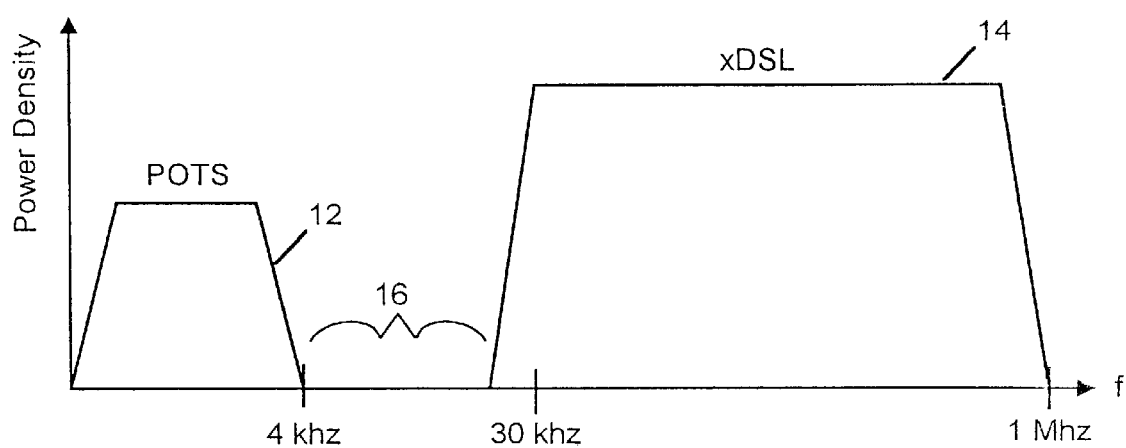
FIG. 1 is an illustration of the frequency spectrum of a dual frequency band communications system of the prior art, depicting the POTS transmission frequency band and the xDSL transmission frequency band.

Having summarized the invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, FIG. 1 is a diagram illustrating frequency band communications, as is known in the prior art. The term frequency band communications is used to indicate communication of information within a certain defined frequency band. As is known in the prior art, plain old telephone system (POTS) communications are transmitted in the frequency band 12 defined between about 0 (DC) and about 4 kHz. A second transmission frequency band 14 is defined at a higher frequency level than the POTS frequency band 12, and is used in the transmission of digital subscriber line (DSL) communications. A guard dead band 16 is typically provided to separate the two transmission frequency bands 12 and 14. The DSL transmission frequency band 14 is more broadly denominated as "xDSL", wherein the "x" generically denominates any of a number of transmission techniques within the DSL family. For example, ADSL—Asymmetric Digital Subscriber Line, RADSL—Rate Adaptive Digital Subscriber Line, HDSL—High-Bit-Rate DSL, etc. As is known, xDSL transmission frequency bands 14 may encompass a bandwidth of greater than 1 MHz. As a result, and for the reasons described above, without the addition of extra equipment such as POTS filters, splitters, etc., xDSL signals are not compatible with attached POTS type equipment, such as telephones, PSTN modems, facsimile machines, etc.

As will be discussed in more detail below, the present invention provides an upper transmission band having an upper frequency boundary that is much lower than the 1 MHz frequency boundary often encountered in xDSL transmissions. Indeed, the upper frequency boundary of the present invention is defined in a range that is readily supported by, or compatible with, transmission systems (and attached POTS-type equipment) presently in place between a customer premises and a central office, without the need for extraneous devices such as POTS filters and POTS splitters. In this regard, reference is made to FIG. 2, which is a top level diagram illustrating the principal hardware components of a system utilizing the present invention. In accordance with one aspect of the invention, a modem 20 is provided for achieving efficient data communications between a customer premises 22 and a central office 24 across a local loop 26, by dynamically allocating a transmission frequency bandwidth and/or power for transmitting data. Certainly, one of the factors motivating the development of the present invention is the expanded demand for higher speed communications in recent years. This enhanced demand is primarily attributed to communications over the Internet.

The present invention dynamically allocates a data transmission frequency band and/or power spectral density (PSD) in response to POTS communications across the same line. More particularly, the present invention may utilize the frequency band otherwise allocated for POTS/voice transmission, at times when there is no present demand for transmitting voice information. When, however, there is a demand for voice transmissions, then the present invention reallocates the transmission frequency band and PSD for the data communications so that there is no overlap or interference with the POTS transmission frequency band 12, and so that there is not significant interference to POTS-type attached equipment.

Figure 2:
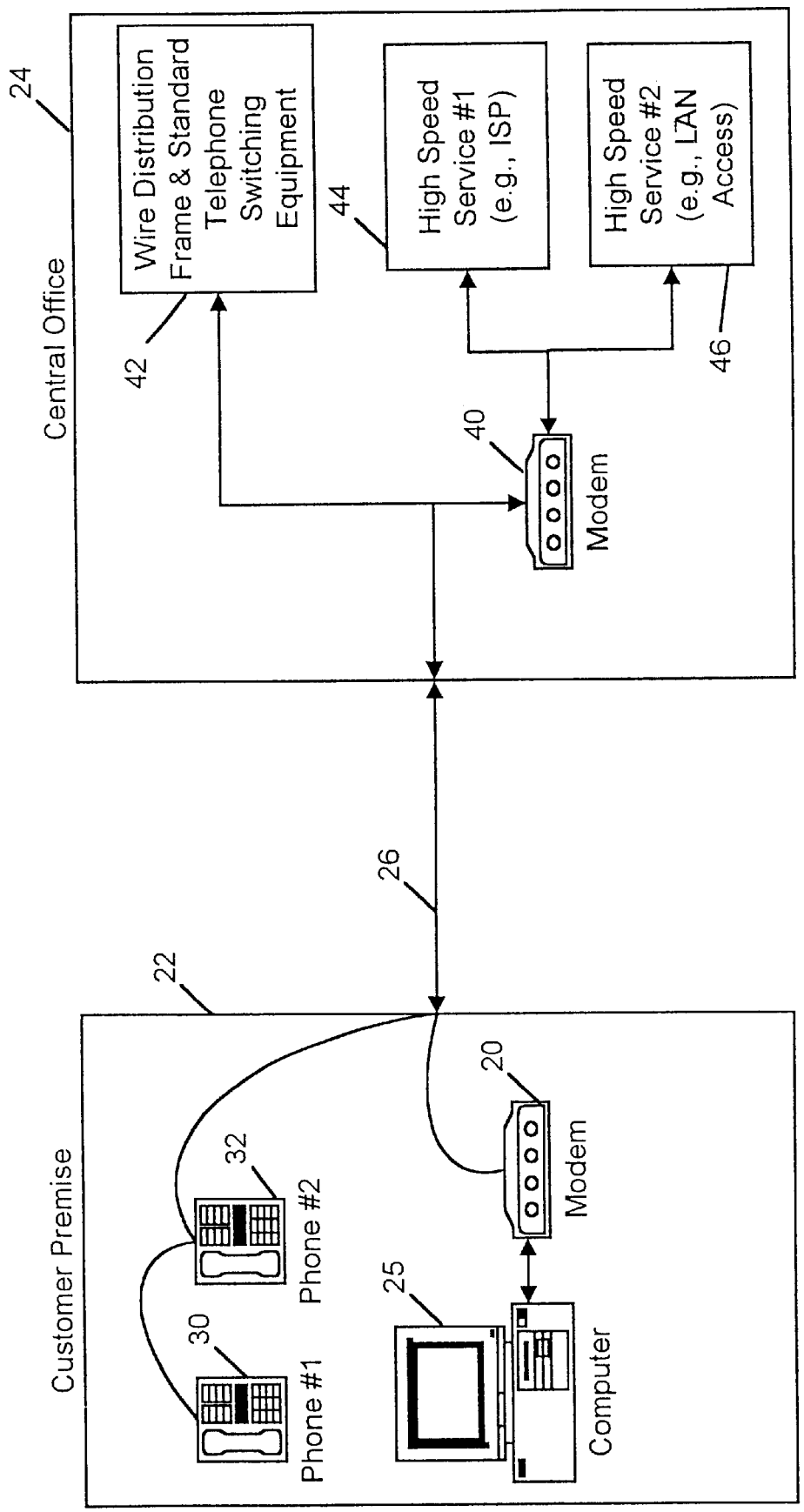
FIG. 2 is a block diagram illustrating the primary components in a system utilizing the present invention.

In keeping within the description of FIG. 2, the customer premises 22 may be a single-family household having a single phone line 26 for communicating between the customer premises 22 and a central office 24. Within the house or customer premises 22, multiple connections branch off of the local loop 26 and are terminated at phone jacks (such as RJ-11) located in various rooms of the household. In this way, multiple telephones 30 and 32 may be plugged in and supported from the same phone line 26. In the same way, a personal computer 25 may be disposed in communication with the local loop 26 by way of a modem 20.

Presently, unless a user purchases an additional phone line, or a more costly communication service, such as xDSL, simultaneous transmissions of voice and data to different locations are not possible. As a result, one person in a household may have the local loop 26 tied up with data communications (such as Internet communications), while another person at the same household is awaiting the use of the local loop 26 for voice communication. In accordance with the present invention, and as will be discussed in more detail below, this shortcoming is overcome.

In keeping with the description of FIG. 2, a companion modem 40, that is compatible with the modem 20, is provided at the central office 24. As is known, other equipment, such as wire distribution frame and standard telephone switching equipment 42 may also be in communication with the local loop 26. Since the configuration and operation of such equipment is known in the prior art and does not effect or impact the present invention, it will not be discussed herein. FIG. 2 also illustrates a variety of services that may be connected at the central office 24 to the modem 40, constructed in accordance with the present invention. These services may include a high speed ISP service 44, a high speed LAN access service 46, etc. Again, since the provision and operation of such services are generally understood and are further not necessary in order to describe the operation of the present invention, they will not be described herein.

Figure 3A:
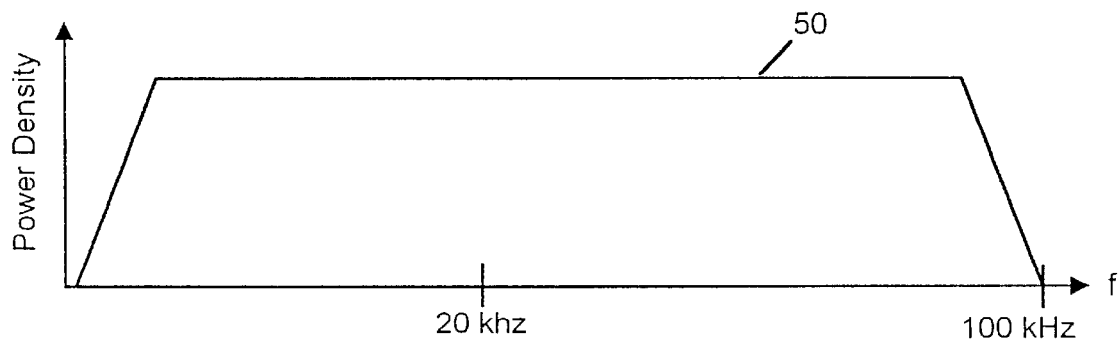
FIG. 3A is a frequency spectrum illustrating the full-band transmission frequency band of the present invention.
Figure 3B:
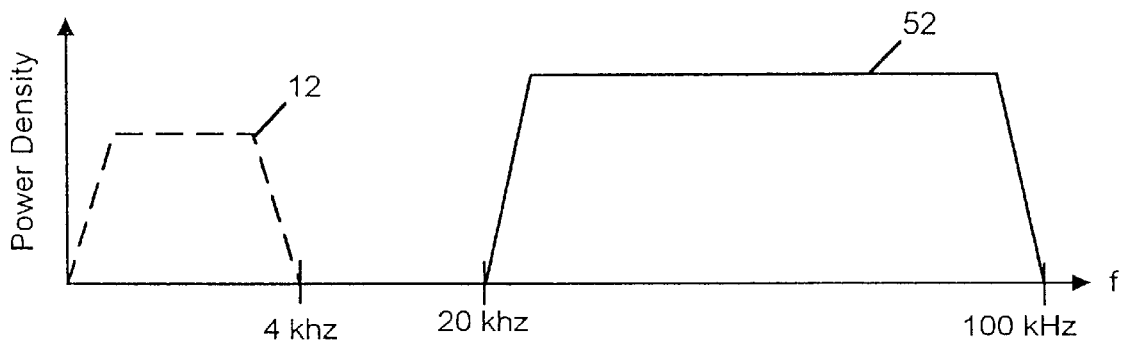
FIG. 3B is a frequency spectrum illustrating the band-limited transmission frequency band of the present invention.

Turning now to FIGS. 3A and 3B, the dynamic allocation and deallocation of the data transmission frequency band is illustrated. Specifically, FIG. 3A illustrates the data transmission frequency band 50 in a full band transmission frequency state, while FIG. 3B illustrates a data transmission frequency band 52 in a band-limited (POTS compatible) transmission frequency state. As illustrated in FIG. 3A, the full-band transmission frequency band 50 extends from approximately 0 Hz (DC) to approximately 100 kHz. In contrast, in FIG. 3B the data transmission frequency band 52 extends from approximately 20 kHz to approximately 100 kHz. In accordance with an important aspect of the preferred embodiment, a modem 20 constructed in accordance with the invention senses the need to dynamically allocate or deallocate a portion of the transmission frequency band in order to accommodate voice communications within the 0 to 4 kHz POTS frequency band 12. As will be described further herein, the present invention may sense this demand for voice transmissions (or band-limiting condition) by sensing an OFF-HOOK condition of a telephone 30, 32, (see FIG. 2) connected to the local loop 26. Alternatively, this band-limiting condition may be detected by an impedance change on the local loop 26.

For phone compatibility, in addition to detecting RING and OFF-HOOK conditions, the system may also be configured to detect voice conversation. Upon voice detection, the system may increase transmit power as it shifts into the band-limited transmission state, to increase data rate dynamically, so long as the voice band SNR is about 30 to 40 dB. When silence is once again detected (for a predetermined amount of time), the system will again reduce the transmit power for good idle channel perception.

Unlike typical xDSL communications, where the data transmission frequency band is often 1 MHz in width, the data transmission frequency band of the present invention is much less than that. This permits relatively high-speed data communication without the addition of expensive equipment, such as POTS splitters and POTS filters. Importantly, this addresses a market need from consumers that do not wish to incur, or cannot afford, the additional expenses normally incurred with purchasing an xDSL communication service. An important aspect of the present invention is its ability to sense when voiceband communications are not occurring, or otherwise when a band-limiting condition is not present, and expand the transmission frequency band into the frequency band otherwise reserved for POTS transmissions, and/or increase transmit power to increase the data rate. As can be seen from the illustrations in FIGS. 3A and 3B, expanding the transmission frequency band from a 20 kHz cutoff (FIG. 3B) to approximately DC (FIG. 3A) realizes a 25 percent increase in bandwidth (i.e., from 80 kHz to 100 kHz), and thus, realizes a significant improvement in performance.

Figure 3C:
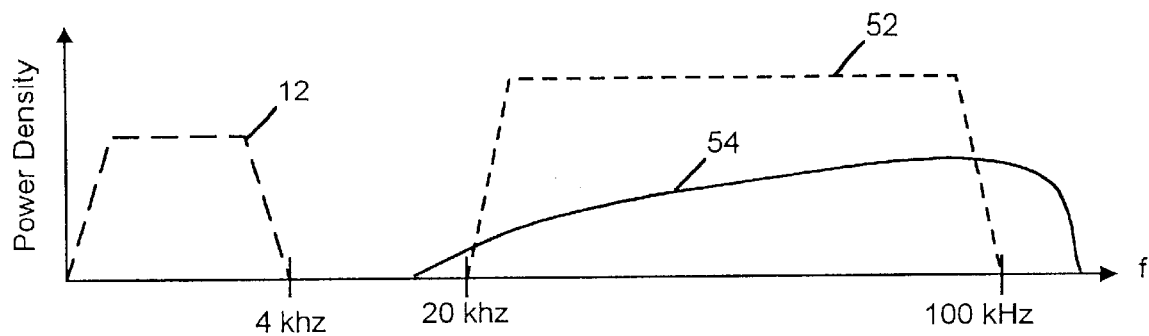
FIG. 3C is a frequency spectrum illustrating a band-limited transmission frequency band of an alternative embodiment of the present invention, having a uniquely shaped xDSL transmission band.
Figure 3D:
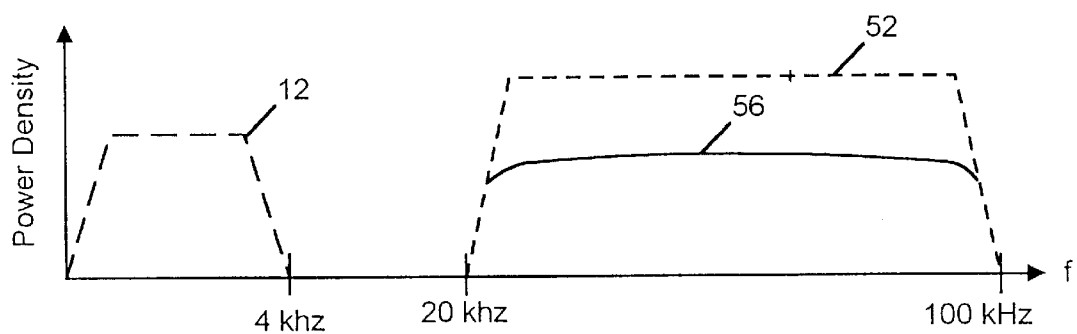
FIG. 3D is a frequency spectrum illustrating a band-limited transmission frequency band of an alternative embodiment of the present invention, having a reduced power xDSL transmission band.

FIGS. 3C and 3D illustrate alternative embodiments of the present invention. In short, FIGS. 3C and 3D illustrate a spectrally-shaped transmission curve and an adaptive power transmission curve, respectively. As illustrated in FIG. 3B, under normal operating condition, the power density of the xDSL transmission band is greater than that of the POTS transmission band. However, there may be instances when the guard band 16 is not large enough to sufficiently separate the xDSL transmission band 52 from the POTS frequency band 12. As a result, xDSL transmissions may be evident in the POTS frequency band 12 as noise (audible static). The reasons this may occur are varied, and include factors such as telephone set sensitivity and non-linearities. Intermodulation products may also be manifest within the POTS transmission band 12 as noise.

It will be appreciated that, consistent with the concepts and teachings of the present invention, various adaptations of the band-limited transmission state may be implemented to minimize or eliminate noise in the POTS transmission band 12. One solution is to further increase the size of the guard band 16, thereby increasing the frequency separation between the POTS transmission band 12 and the xDSL transmission band 52. Another solution is to adaptively reduce the transmit power of the xDSL transmission band. This solution is illustrated in FIG. 3D, wherein the normal power spectrum 52 is illustrated in dashed line and the reduced power spectrum 56 is superimposed in solid line. Reducing the transmit power in this way reduces the amount of noise that is manifest within the POTS frequency band. The specific amount of power reduction may vary among customer premises, based upon the attached equipment.

Yet another solution is to more particularly define the spectral shape of the transmission band. This solution is illustrated in FIG. 3C. As shown, the power spectrum of the xDSL transmission band 54 may be asymmetrically shaped to provide a greater taper on the lower frequency end of the curve. This taper ensures sufficient attenuation of the xDSL transmission signal above the POTS frequency band 12, and therefore minimizes intermodulation products and noise (resulting from the xDSL transmission) within the POTS band 12. Although only one such shaped signal band 56 is illustrated in FIG. 3D, it will be appreciated that this aspect of the invention is not so limited. Instead, other shapes may be deemed desirable, depending upon the specific environment and line conditions.

Figure 4:
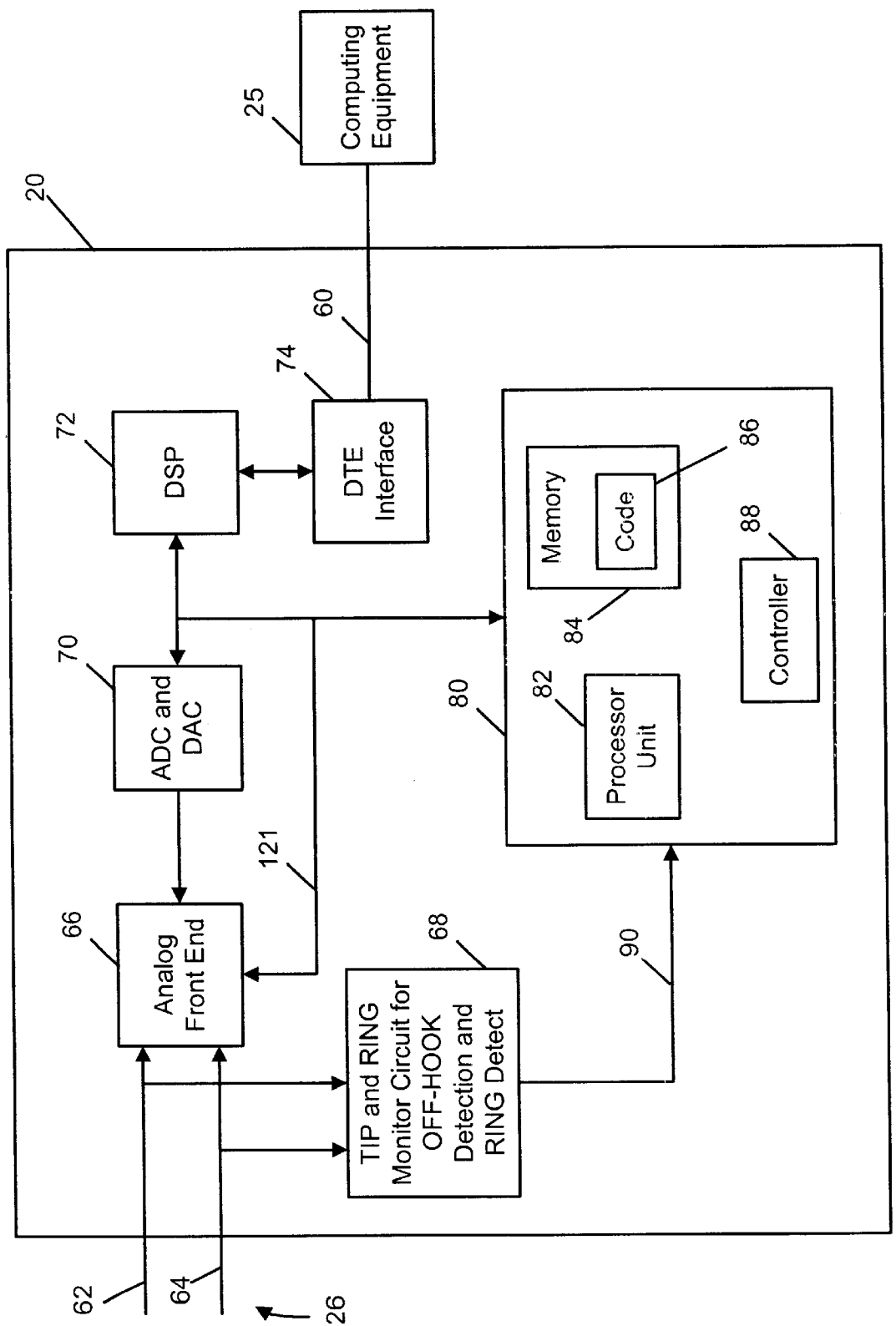
FIG. 4 is a block diagram illustrating the primary components of a modem constructed in accordance with the present invention.

Reference is now made to FIG. 4, which shows a block diagram of a modem 20 constructed in accordance with the present invention. As is common among modems, the modem 20 is in communication with both a local loop 26 and computing equipment 25, such as a personal computer. More specifically, the modem 20 communicates with the computing equipment 25 across line 60. The telephone line 26 is typically comprised of a two wire service, which wires are often denoted as TIP 62 and RING 64. The TIP 62 and RING 64 lines are input to an analog front-end circuit 66 (see FIG. 5) as well as a monitor circuit 68, which is configured to detect an OFF-HOOK condition of the local loop 26.

Analog-to-digital and digital-to-analog converter (ADC and DAC, respectively) circuitry 70 is in communication with the analog front end circuitry 66, and is in further communication with digital signal processor 72. Data received from the local loop 26 passes through the analog front-end 66 and is converted from analog-to-digital form by the analog to digital converter of block 70, before being passed to the digital signal processor 72. Conversely, outgoing data output from the digital signal processor 72 is converted by the digital to analog converter of block 70, before being communicated to the local loop 26, by way of the analog front-end 66. Finally, Data Terminal Equipment (DTE) interface 74 is in communication with the digital signal processor 72 and in further communication across line 60, with the data terminal equipment, such as a computer 25. The analog-to-digital and digital-to-analog converter circuitry 70, the digital signal processing 72, and the DTE interface 74 are all well known and generally operate in accordance with the prior art. Therefore, their individual structure and operation need not be described herein.

Indeed, a significant component of the modem 20, constructed in accordance with the present invention, is a controller 80 that is in communication with the various other components of the modem 20. While there are various ways to implement the controller 80, one way, as illustrated, is to further partition the controller 80 into functional units denoted as a processing unit 82, a memory 84 (which may further include an executable code segment 86), and a controller 88.

For purposes of the broad concepts of the present invention, the controller 80 receives a signal from the monitor circuit 68 on line 90, which signal indicates whether the invention should transmit data in a band-limited transmission state or a full-band transmission state. In this regard, the monitor circuitry 68 may be configured to detect an OFF-HOOK condition, or alternatively, a RING condition on local loop 26. As is known in the art, the OFF-HOOK condition may be detected by a drop in voltage across the local loop 26, or alternatively, a sudden change in impedance on the local loop 26. On the other hand, a RING detect condition is identified by a low frequency oscillatory voltage on local loop 26. For example, the voltage drops from about 48 volts (on hook) to approximately 10 volts or less (off hook), at the customer premises end of the local loop. In short, the controller 80 evaluates the signal received on line 90 to determine whether data should be transmitted in the full-band transmission state or the band-limited transmission state. Appropriate signals may, accordingly, be transmitted to the digital signal processor 72 for formulating data transmissions (or interpreting received data transmissions).

In accordance with an alternative embodiment of the invention, it will be appreciated that the monitor circuitry 68 may be incorporated within the controller 80, whereby certain signal conditions may be evaluated to detect the band-limiting condition. In this regard, an analog-to-digital converter 70 would also be implemented as part of the controller 80, to generate a signal in digital format which may be more readily evaluated and processed by the processing unit 82. In this regard the processing unit 82 may be a microprocessor, a microcontroller, an application specific integrated circuit (ASIC), or other digital circuitry configured to specifically process information. In the illustrated embodiment, the controller 80 includes fundamental components (processor unit 82, controller 88, memory 84) that together operate to perform distinct computing operations. Such operations may be controlled, for example, by executable code 86 contained within the memory 84.

Figure 5:
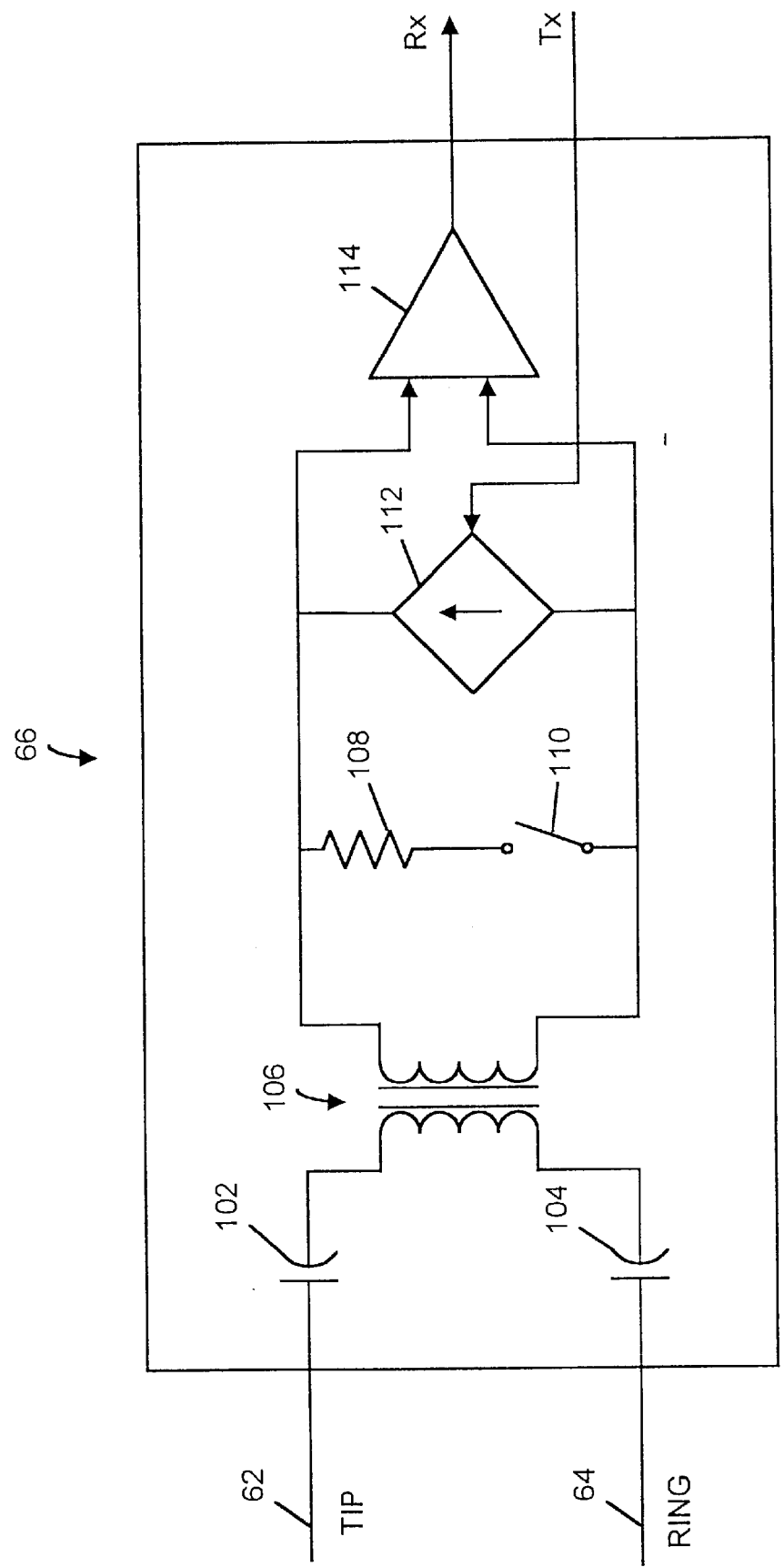
FIG. 5 is a circuit diagram illustrating the analog front end component of the modem block diagram of FIG. 4.

Reference is now made to FIG. 5, which shows a more detailed diagram of the circuitry comprising the analog front end element 66. The preferred embodiment includes blocking capacitors 102 and 104, which are series connected with the TIP 62 and RING 64 signal lines, and serve to block any DC voltage otherwise carried on the TIP 62 and RING 64 lines. A transformer 106 couples alternating current to the remainder of the circuitry, as well as provides safety and signal isolation for the remaining circuitry in the modem. A termination resistor 108 and switch 110 are disposed for series connection with each other (depending upon whether the switch 110 is opened or closed), and together are connected in parallel across the secondary winding of the transformer 106. The switch 110 is controlled by controller 80 (FIG. 4) to close and therefore switch in the terminating resistor 108 when the telephones 30 and 32 (see FIG. 2) are all ON-HOOK (as observed by the monitor circuit 68). The switch 110 may be open to switch out the terminating resistor 108, upon detection of an incoming RING signal or OFF-HOOK on the local loop 26. Capacitors 102 and 104 are chosen to pass data, block DC, and yield acceptable Ringer Equivalence Number per FCC part 68. The switch 110 is generally opened to switch out the terminating resistor when the monitor circuit 68 determines that the local loop 26 is in the OFF-HOOK state. The reason for this is that, when one or more telephones are taken OFF-HOOK, then the OFF-HOOK telephone will terminate the line, and the terminating resistor 108 is not needed. Optionally, the switch 110 can be closed in the OFF-HOOK state to improve line termination provided by the OFF-HOOK telephone.

The item represented by reference numeral 112 denotes circuitry that is configured in a form of a dependent current source. The current source is prompted by the transmit signal Tx to create an outgoing transmission signal. As a current source, the item 112 has a very high impedance (as seen across the secondary winding of transformer 106), and therefore, only the termination resistor 108 operates to terminate the line (when switched in). Similarly, amplifier 114 is the receive amplifier that generates the receive signal Rx, as is known in the art. Like the current source 112, the amplifier 114 has an extremely high input impedance and thus does not affect line termination.

Figure 6:
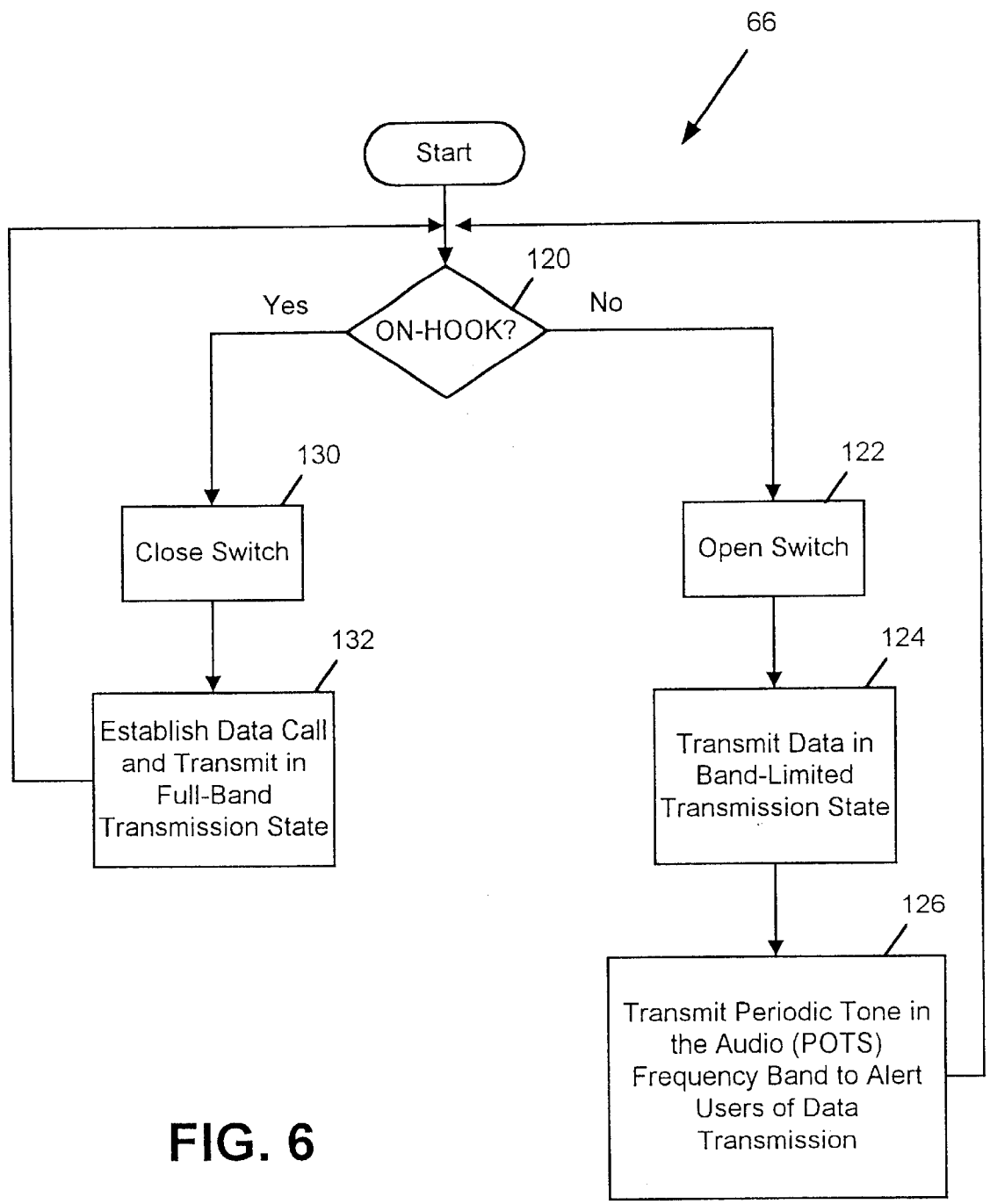
FIG. 6 is a software flowchart depicting the functional operation of the analog front end element, illustrated in FIG. 5.

Reference is now made to FIG. 6, which shows a software flow-chart illustrating the operation of the analog front-end element 66 of FIG. 5. Beginning at step 120, the element 66 determines whether the local loop 26 is ON-HOOK or OFF-HOOK. As will be appreciated from the foregoing discussion, this decision is made by the controller 80, which outputs a signal 121 (see FIG. 4) to the analog front-end 66 indicative of the ON-HOOK/OFF-HOOK status. If the resolution of step 120 is NO, the analog front-end element 66 opens switch 110 (step 122) to remove the termination resistor 108 from the circuit. That is, if the system detects that a telephone connected to the local loop 26 is OFF-HOOK, it will remove the termination resistor 108 from the circuit, since the line will then be terminated by the OFF-HOOK telephone. Thereafter, operation proceeds to step 122, wherein data is transmitted in accordance with the band-limited transmission frequency band (e.g., 20 kHz–100 kHz). In accordance with one embodiment of the present invention, the system may emit periodic tones within the audible frequency range to alert a user talking on an attached telephone 30, 32 (see FIG. 2) that the local loop 26 is also being used for data transmissions. Thus, a person, for example, speaking in another part of the house over a telephone hearing periodic beeps would know that someone else in the household is using a computer 25 (see FIG. 2) to communicate data, and therefore, may wish to keep his or her conversation to a minimum, in order to free up the local loop 26, so that the present invention may obtain a full utilization of the full-banded transmission frequency band, for maximum data throughput.

If the resolution of step 120 is YES, indicating that all telephones 30, 32 (see FIG. 2) attached to the local loop 26 are ON-HOOK, then the system ensures that switch 110 is closed thereby placing termination resistor 108 in the circuit, so as to achieve proper line termination (step 130). Thereafter, the system may transmit data across the local loop utilizing the entire, full-band transmission frequency (i.e., DC to approximately 100 kHz).

Figure 7:
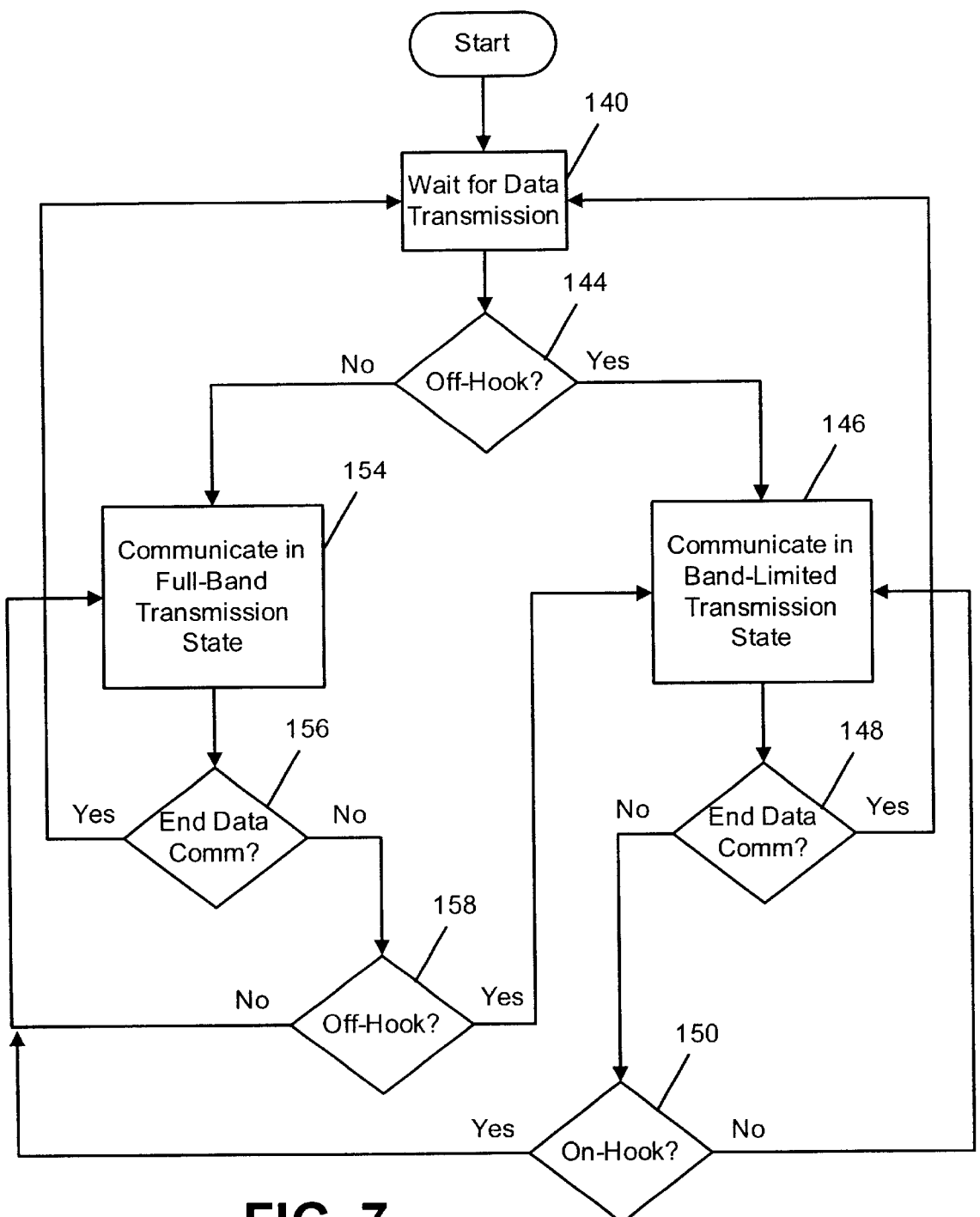
FIG. 7 is a software flowchart illustrating the top-level operation of a system constructed in accordance with the present invention.

Reference is now made to FIG. 7, which is a software flow-chart illustrating the top-level operation of a system communicating in accordance with the present invention. Beginning at block 140, the system awaits the initiation of data transmission. This initiation may occur either upon the instruction of a user at the computer 25 (see FIG. 2), or alternatively, from a remote user that is dialing the phone number of computer 25 to connect up to that computer (this assumes that that computer 25 is in auto answer mode). Once the system has been instructed to begin data communications, it first makes a check (at step 144) to determine whether the loop is in the OFF-HOOK state. If so, it begins the data communications in the band-limited frequency transition state (step 146) (e.g., 20 kHz–100 kHz). During the data transmissions, the system will make continuous checks to determine whether the data transmission has ended (step 148), or whether the band-limiting condition has subsided (step 150). As previously mentioned, the band-limiting condition is generally identified by the OFF-HOOK detection circuitry. If the end data communications check, at step 148, resolves to YES, then the system returns to step 140. If not, the system proceeds to step 150 where it checks for the cessation of the band-limiting condition. If this step resolves to YES, then the system continues the data transmission in the full-band transmission frequency bandwidth (step 154).

Returning to the decision block 144, if, upon initiation of data communication, the system determines that all telephones are presently ON-HOOK, then the system proceeds to step 154 where it transmits data in accordance with the full-band data transmission state (i.e., utilizing the full 0 to 100 kHz transmission frequency bandwidth). During transmission in this frequency band, the system periodically checks to see if the data communications has terminated (step 156), or whether the occurrence of a band-limiting condition has occurred (step 158). This latter condition occurs, for example, when a person lifts a handset of an attached telephone 30, 32 (see FIG. 2). If this occurs, the system proceeds to step 146 and continues the data transmissions in accordance with the band-limited transmission frequency band (20 kHz–100 kHz).

It will be appreciated from a review of the flow-chart of FIG. 7, that the system, during data transmission, can dynamically shift back and forth between the full-band and band-limited transmission frequency bandwidths as users may lift or reset telephone 30, 32 (see FIG. 2) handsets (or as RING conditions occur). It will be appreciated, however, that other band-limiting conditions (other than RING or OFF-HOOK) may be utilized to invoke the frequency shifting feature of the present invention, depending upon the system configuration or other pertinent system factors.

It will be appreciated that the invention described herein could provide a low-cost solution to Internet access for the mass consumer market. In this regard, it could fill the gap between low-cost 33.6 kbps modems and high speed xDSL modems, which require the addition of relatively expensive equipment (such as POTS splitters and POTS filters) at the customer premises, and is labor intensive. The present invention, as described above, generally achieves transmission rates in the range of 64 kbps to 640 kbps.

As described above, the invention utilizes the low frequency portion of the telephone subscriber loop spectrum (roughly DC to approximately 100 kHz) to transport user data. The modulation could be CAP (carrierless amplitude-phase), QAM (quadrature amplitude modulation), DMT (discrete multi-tone), spread spectrum, etc., as the invention is not limited to any particular form. Utilization of the lower frequency portion of the telephone subscriber loop has the advantage of the lowest possible signal attenuation (usually the number one signal impairment in data communications) and low cross-talk. Other advantages are reduced transmission line concerns like reflections due to stubs.

In use, the invention requires a simple bridge (electrical parallel) connection to the subscriber loop or premise wiring. Therefore, one unit would connect (in bridge fashion) at the central office, and one companion unit connect at the customer premises.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

We claim:

1. A system for communicating both voice and data between a customer premises and a central office across a communication link comprising:
   means for transmitting data between the customer premises and the central office in a first frequency band, wherein the first frequency band is defined by an upper frequency boundary and a lower frequency boundary;
   means for allocating a second frequency band for transmitting voice information between the customer premises and the central office in the second frequency band;
   means for sensing a band-limiting condition; and
   means for shifting the lower frequency boundary of the first frequency band to a frequency greater than 4 kilohertz in response to the sensed band-limiting condition.

2. The system of claim 1, wherein the means for shifting the lower frequency boundary includes shifting the lower frequency boundary of the first frequency band to at least partially overlap between the first frequency band and the second frequency band, when the band-limiting condition is not present.

3. The system of claim 1, wherein the means for shifting the lower frequency boundary includes shifting the lower frequency boundary of the first frequency band so that there is no overlap between the first frequency band and the second frequency band, when the band-limiting condition is present.

4. The system of claim 1, wherein the means for sensing a band-limiting condition includes sensing an off-hook condition of a telephone electrically connected to the communication link such that the off-hook condition corresponds to the band-limiting condition.

5. The system of claim 1, further including the means for shifting the upper frequency boundary of the first frequency band in response to the sensed band-limiting condition.

6. The system of claim 1, wherein the lower frequency boundary is less than 4 kilohertz.

7. The system of claim 1, wherein the lower frequency boundary is approximately DC.

8. The system of claim 7, wherein the means for shifting the lower frequency boundary shifts the lower frequency boundary upwardly to a frequency of approximately 20 kilohertz in response to the sensed band-limiting condition.

9. The system of claim 1, wherein the means for sensing the band-limiting condition includes the means for detecting the onset of a condition indicative of demand for voice communications.

10. The system of claim 1, wherein the means for sensing the band-limiting condition includes the means for detecting the cessation of a condition indicative of termination of voice communications.

11. The system of claim 10, wherein the means for shifting the lower frequency boundary shifts the lower frequency boundary from a value greater than 4 kilohertz to a value less than 4 kilohertz when the means for detecting detects the cessation of a condition indicative of demand for voice communications.

12. The system of claim 11, further including the means for shifting the upper frequency boundary of the first frequency band when the means for detecting detects the cessation of a condition indicative of demand for voice communications.

13. The system of claim 1, wherein said system is a modem.

14. The system of claim 1, wherein the means for sensing a band-limiting condition includes sensing an impedance change on the communication link such that the sensed impedance change corresponds to the band-limiting condition.

15. The system of claim 1, wherein the means for sensing a band-limiting condition includes sensing a voice conversation on the communication link such that the sensing of the voice conversation corresponds to the band-limiting condition.

16. The system of claim 1, wherein the means for shifting the lower frequency boundary further includes means for decreasing the transmit power of the first frequency band when the band-limiting condition is present.

17. The system of claim 16, wherein the means for shifting the lower frequency boundary further includes means for increasing the transmit power of the first frequency band when the band-limiting condition is not present.

18. The system of claim 1, wherein the means for shifting the lower frequency boundary further includes means for increasing the transmit power of the first frequency band when the band-limiting condition is present.

19. The system of claim 18, wherein the means for shifting the lower frequency boundary further includes means for decreasing the transmit power of the first frequency band when the band-limiting condition is not present.

20. The system of claim 1, further including a means for emitting an audible signal when the first frequency band is present and when the band-limiting condition is present in order to indicate communication of the data.

21. The system of claim 1, further comprising a means to allocate a first power spectral density (PSD) when the band-limiting condition is present and a means to allocate a second PSD when the band-limiting condition is not present.

22. The system of claim 1, further comprising a front end element, said front end element comprising:
   a line termination resistor; and
   means for switching disposed in series with the line termination resistor, wherein the line termination resistor and the means for switching are disposed in parallel to a pair of conductors residing in the communication link such that the means for switching connects the line termination resistor between said pair of conductors when the band-limiting condition is not present, and such that the means for switching disconnects the line termination resistor from said pair of conductors when the band-limiting condition is present.

23. The system of claim 1, wherein the lower frequency boundary of the first frequency band is initially less than 4 kilohertz.

24. The system of claim 1, wherein the lower frequency boundary of the first frequency band is initially greater than 4 kilohertz.

25. The system of claim 1, wherein the means for shifting further comprises means for dynamically shifting.

26. A method for communicating both voice and data between a customer premises and a central office across a communication link comprising the steps of:

transmitting data between the customer premises and the central office in a first frequency band, wherein the first frequency band is defined by an upper frequency boundary and a lower frequency boundary;

allocating a second frequency band for transmitting voice information between the customer premises and the central office in the second frequency band;

sensing a band-limiting condition; and shifting the lower frequency boundary of the first frequency band to a frequency greater than 4 kilohertz in response to the sensed band-limiting condition.

27. The method of claim 26, wherein the step of shifting the lower frequency boundary includes shifting the lower frequency boundary of the first frequency band to at least partially overlap between the first frequency band and the second frequency band, when the band-limiting condition is not present.

28. The method of claim 26, wherein the step of shifting the lower frequency boundary includes shifting the lower frequency boundary of the first frequency band so that there is no overlap between the first frequency band and the second frequency band, when the band-limiting condition is present.

29. The method of claim 26, wherein the step of sensing a band-limiting condition includes sensing an off-hook condition of a telephone electrically connected to the communication link.

30. The method of claim 26, further including the step of shifting the upper frequency boundary of the first frequency band in response to the sensed band-limiting condition.

31. The method of claim 26, wherein the lower frequency boundary is less than 4 kilohertz.

32. The method of claim 26, wherein the lower frequency boundary is approximately DC.

33. The method of claim 32, wherein the step of shifting the lower frequency boundary includes the step of shifting the lower frequency boundary upwardly to a frequency of approximately 20 kilohertz in response to the sensed band-limiting condition.

34. The method of claim 26, wherein the step of sensing the band-limiting condition includes the step of detecting the onset of a condition indicative of demand for voice communications.

35. The method of claim 26, wherein the step of sensing the band-limiting condition includes the step of detecting the cessation of a condition indicative of the termination of voice communications.

36. The method of claim 35, wherein the step of shifting the lower frequency boundary includes the step of shifting the lower frequency boundary from a value greater than 4 kilohertz to a value less than 4 kilohertz when the step of detecting detects the cessation of a condition indicative of demand for voice communications.

37. The method of claim 36, further including the step of shifting the upper frequency boundary of the first frequency band when the means for detecting detects the cessation of a condition indicative of demand for voice communications.

38. The method of claim 35, wherein said system is a modem.

39. The method of claim 35, wherein the step of shifting the lower frequency boundary includes the step of shifting the lower frequency boundary from a value greater than 4 kilohertz to a lower value, the lower value greater than 4 kilohertz, when the step of detecting detects the cessation of a condition indicative of demand for voice communications.

40. The method of claim 26, wherein the step of sensing a band-limiting condition includes sensing an impedance change on the communication link such that the sensed impedance change corresponds to the band-limiting condition.

41. The method of claim 26, wherein the step of sensing a band-limiting condition includes sensing a voice conversation on the communication link such that the sensing of the voice conversation corresponds to the band-limiting condition.

42. The method of claim 26, wherein the step of shifting the lower frequency boundary further includes the step of increasing the transmit power of the first frequency band when the band-limiting condition is not present.

43. The method of claim 42, wherein the step of shifting the lower frequency boundary further includes the step of decreasing the transmit power of the first frequency band when the band-limiting condition is present.

44. The method of claim 26, wherein the step of shifting the lower frequency boundary further includes the step of decreasing the transmit power of the first frequency band when the band-limiting condition is not present.

45. The method of claim 44, wherein the step of shifting the lower frequency boundary further includes the step of increasing the transmit power of the first frequency band when the band-limiting condition is present.

46. The system of claim 1, wherein the means for shifting the lower frequency boundary further includes means for asymmetrically shaping a portion of the first frequency band when the band-limiting condition is present.

47. The method of claim 26, wherein the step of shifting the lower frequency boundary further includes the step of asymmetrically shaping a portion of the first frequency band when the band-limiting condition is present.

48. The method of claim 26, further including the step of emitting an audible signal when the first frequency band is present and when the band-limiting condition is present in order to indicate communication of the data.

49. The method of claim 26, further comprising the step of allocating a first power spectral density (PSD) when the band-limiting condition is present and the step of allocating a second PSD when the band-limiting condition is not present.

50. The method of claim 26, further comprising the steps of:

switching a line termination resistor so that the line termination resistor is connected in parallel with a pair of conductors residing in the communication link when the step of sensing senses the band-limiting condition; and switching the line termination resistor so that the line termination resistor is disconnected from the pair of conductors residing in the communication link when the step of sensing senses an absence of the band-limiting condition.

51. The method of claim 26, wherein the step of shifting further comprises dynamically shifting.

52. The method of claim 26, wherein the step of shifting further comprises shifting the lower frequency boundary of the first frequency band from an initial frequency less than 4 kilohertz to the frequency greater than 4 kilohertz in response to the sensed band-limiting condition.

53. The method of claim 26, wherein the step of shifting further comprises shifting the lower frequency boundary of the first frequency band from an initial frequency greater than 4 kilohertz to a greater frequency in response to the sensed band-limiting condition.

54. A system for communicating both voice and data between a customer premises and a central office across a communication link comprising:

means for transmitting data between the customer premises and the central office in a first frequency band, wherein the first frequency band is defined by an upper frequency boundary and a lower frequency boundary;

means for sensing a band-limiting condition;

means for shifting the lower frequency boundary of the first frequency band to a frequency greater than 4 kilohertz in response to the sensed band-limiting condition; and means for emitting an audible signal when the first frequency band is present and when the band-limiting condition is present in order to indicate communication of the data.

55. The system of claim 54, wherein the means for shifting further comprises means for dynamically shifting.

56. The system of claim 54, further comprising means for shifting the lower frequency boundary of the first frequency band from an initial frequency less than 4 kilohertz to the frequency greater than 4 kilohertz in response to the sensed band-limiting condition.

57. The system of claim 54, further comprising means for shifting the lower frequency boundary of the first frequency band from an initial frequency greater than 4 kilohertz to a greater frequency in response to the sensed band-limiting condition.

58. A method for communicating both voice and data between a customer premises and a central office across a communication link comprising the steps of:

transmitting data between the customer premises and the central office in a first frequency band, wherein the first frequency band is defined by an upper frequency boundary and a lower frequency boundary;

sensing a band-limiting condition;

shifting the lower frequency boundary of the first frequency band to a frequency greater than 4 kilohertz in response to the sensed band-limiting condition; and emitting an audible signal when the first frequency band is present and when the band-limiting condition is present in order to indicate communication of the data.

59. The method of claim 58, wherein the step of shifting further comprises dynamically shifting.

60. The method of claim 58, wherein the step of shifting further comprises shifting the lower frequency boundary of the first frequency band from an initial frequency less than 4 kilohertz to the frequency greater than 4 kilohertz in response to the sensed band-limiting condition.

61. The method of claim 58, wherein the step of shifting further comprises shifting the lower frequency boundary of the first frequency band from an initial frequency greater than 4 kilohertz to a greater frequency in response to the sensed band-limiting condition.

62. A system for communicating both voice and data between a customer premises and a central office across a communication link comprising:

means for allocating a first frequency band for transmitting data between the customer premises and the central office, wherein the first frequency band is defined by an upper frequency boundary and a lower frequency boundary;

means for determining the initiation of data transmission on the first frequency band;

means for sensing a band-limiting condition;

means for setting the lower frequency boundary of the first frequency band: to a first lower frequency greater than 4 kilohertz in response to determining initiation of data transmission and the sensing of the band-limiting condition; and means for setting the lower frequency boundary of the first frequency band to a second lower frequency, the second lower frequency less than the first lower frequency, in response to determining initiation of data transmission and to the sensing of an absence of the band-limiting condition.

63. The system of claim 62, wherein the means for sensing the band-limiting condition further includes means for sensing transmitted voice information between the customer premises and the central office in a second frequency band, wherein the sensing of voice information corresponds to the band-limiting condition.

64. The system of claim 62, wherein means for determining the initiation of data transmission further includes means for sensing an instruction from the user of a computer.

65. The system of claim 62, wherein means for determining the initiation of data transmission further includes means for sensing dialing of a phone number of a computer operating in an auto answer mode.

66. A method for communicating both voice and data between a customer premises and a central office across a communication link comprising:

allocating a first frequency band for transmitting data between the customer premises and the central office, wherein the first frequency band is defined by an upper frequency boundary and a lower frequency boundary;

determining the initiation of data transmission on the first frequency band;

sensing a band-limiting condition;

setting the lower frequency boundary of the first frequency band to a first lower frequency greater than 4 kilohertz in response to determining initiation of data transmission and the sensing of the band-limiting condition; and setting the lower frequency boundary of the first frequency band to a second lower frequency, the second lower frequency less than the first lower frequency, in response to determining initiation of data transmission and to the sensing of an absence of the band-limiting condition.

67. The method of claim 66, wherein the step of sensing the band-limiting condition further includes the step of sensing transmitted voice information between the customer premises and the central office in a second frequency band, wherein the sensing of voice information corresponds to the band-limiting condition.

68. The method of claim 66, wherein the step of determining the initiation of data transmission further includes the step of sensing an instruction from the user of a computer.

69. The method of claim 66, wherein the step of determining the initiation of data transmission further includes the step of sensing dialing of a phone number of a computer operating in an auto answer mode.

70. The method of claim 66, wherein step of setting the lower frequency boundary of the first frequency band to the first lower frequency further comprises setting the first lower frequency to an initial frequency less than 4 kilohertz.

71. The method of claim 66, wherein the step of setting the lower frequency boundary of the first frequency band to the first lower frequency further comprises setting the first lower frequency to an initial frequency greater than 4 kilohertz.

72. The method of claim 66, wherein the step of setting the lower frequency boundary of the first frequency band to the second lower frequency further comprises setting the second lower frequency to less than 4 kilohertz.

73. The method of claim 66, wherein the step of setting the lower frequency boundary of the first frequency band to the second lower frequency further comprises setting the second lower frequency to greater than 4 kilohertz.

74. A system for communicating both voice and data between a customer premises and a central office across a communication link comprising:

means for sensing a band-limiting condition;

a line termination resistor; and means for switching disposed in series with the line termination resistor, wherein the line termination resistor is disposed in parallel to a pair of conductors residing in the communication link such that the means for switching connects the line termination resistor between said pair of conductors when the band-limiting condition is not present, and such that the means for switching disconnects the line termination resistor from said pair of conductors when the band-limiting condition is present.

75. A method for communicating both voice and data between a customer premises and a central office across a communication link comprising the steps of:

sensing a band-limiting condition;

switching a line termination resistor such that the line termination resistor is connected in parallel with a pair of conductors residing in the communication link when the step of sensing senses the band-limiting condition; and switching a line termination resistor such that the line termination resistor is disconnected from the pair of conductors residing in the communication link when the step of sensing senses an absence of the band-limiting condition.

76. A computer readable medium having a program for communication both voice and data over a communication link, the program comprising logic configured to perform the steps of:

transmitting data between the customer premises and the central office in a first frequency band, wherein the first frequency band is defined by an upper frequency boundary and a lower frequency boundary;

allocating a second frequency band for transmitting voice information between the customer premises and the central office in the second frequency band;

sensing a band-limiting condition;

shifting the lower frequency boundary of the first frequency band to a first frequency to a frequency greater than 4 kilohertz when the step of sensing senses the band-limiting condition, and shifting the lower frequency boundary of the first frequency band to a second lower frequency in response to determining initiation of data transmission and to the sensing of an absence of the band-limiting condition.

77. The computer readable medium of claim 76, further having logic configured to perform the step of shifting the lower frequency boundary of the first frequency band to a second frequency when the step of sensing senses an absence of the band-limiting condition.

78. The computer readable medium of claim 76, further having logic configured to perform the step of switching a line termination resistor such that the line termination resistor is connected in parallel with a pair of conductors residing in the communication link when the step of sensing senses the band-limiting condition.

79. The computer readable medium of claim 78, further having logic configured to perform the step of switching the line termination resistor such that the line termination resistor is disconnected from the pair of conductors residing in the communication link when the step of sensing senses an absence of the band-limiting condition.

80. The computer readable medium of claim 76, wherein the logic configured to shift the lower frequency boundary of the first frequency band to the first frequency shifts the first frequency from an initial frequency greater than 4 kilohertz.

81. The computer readable medium of claim 76, wherein the logic configured to shift the lower frequency boundary of the first frequency band to the first frequency shifts the first frequency from an initial frequency less than 4 kilohertz.

82. The computer readable medium of claim 76, wherein the logic configured to shift the lower frequency boundary of the first frequency band to the second lower frequency shifts the second lower frequency to greater than 4 kilohertz.

83. The computer readable medium of claim 76, wherein the logic configured to shift the lower frequency boundary of the first frequency band to the second lower frequency shifts the second lower frequency to less than 4 kilohertz.

* * * * *